US007783621B2

(12) United States Patent
Cooper

(10) Patent No.: US 7,783,621 B2
(45) Date of Patent: *Aug. 24, 2010

(54) SYSTEM AND METHOD FOR PROXIMITY SEARCHING POSITION INFORMATION USING A PROXIMITY PARAMETER

(76) Inventor: Jeremy S. Cooper, 59 Burlington Dr., Petaluma, CA (US) 94952

( * ) Notice: Subject to any disclaimer, the term of this patent is extended or adjusted under 35 U.S.C. 154(b) by 153 days.

This patent is subject to a terminal disclaimer.

(21) Appl. No.: 11/356,442

(22) Filed: Feb. 17, 2006

(65) Prior Publication Data

US 2007/0016562 A1   Jan. 18, 2007

Related U.S. Application Data

(63) Continuation of application No. 09/840,922, filed on Apr. 25, 2001, now Pat. No. 7,007,010.

(60) Provisional application No. 60/199,551, filed on Apr. 25, 2000.

(51) Int. Cl.
*G06F 17/30* (2006.01)
(52) U.S. Cl. ........................ 707/707; 707/769
(58) Field of Classification Search .................. 707/3, 707/10, 6; 701/1, 2, 3
See application file for complete search history.

(56) References Cited

U.S. PATENT DOCUMENTS

| 5,164,897 | A |   | 11/1992 | Clark et al.   |       |
|-----------|---|---|---------|----------------|-------|
| 5,265,033 | A |   | 11/1993 | Vajk et al.    |       |
| 5,532,838 | A |   | 7/1996  | Barbari        |       |
| 5,551,024 | A | * | 8/1996  | Waters         | 707/3 |
| 5,583,995 | A |   | 12/1996 | Gardner et al. |       |
| 5,781,901 | A |   | 7/1998  | Kuzma          |       |
| 5,793,972 | A |   | 8/1998  | Shane          |       |
| 5,796,952 | A |   | 8/1998  | Davis et al.   |       |

(Continued)

FOREIGN PATENT DOCUMENTS

EP    0989501 A2    9/1999

(Continued)

OTHER PUBLICATIONS

"What is MD5 and Why Do I Care?" by Lance Spitzner http://www.enteract.com/~/spitz/md5.html downloaded Mar. 20, 2000.

(Continued)

*Primary Examiner*—Baoquoc N To
(74) *Attorney, Agent, or Firm*—Sterne, Kessler, Goldstein & Fox P.L.L.C.

(57) ABSTRACT

A computer implemented proximity searcher searches position field information (representing geographical positions) stored in database records, to identify database positions falling within a predetermined search range of a position of interest. The proximity searcher avoids time consuming conventional techniques such as great circle calculations to thereby reduce the computational burden associated with proximity searching, thus achieving time efficient proximity searches to identify candidate geographical positions that are near the position of interest. The proximity searcher identifies the candidate geographical positions within a search range, specified as a proximity parameter, of the position of interest. The proximity parameter and the position field information can have incompatible formats. In one configuration, the proximity searcher resides on a server coupled to a network and responds to user queries provided by, for example, client computers also coupled to the network.

28 Claims, 10 Drawing Sheets

U.S. PATENT DOCUMENTS

| | | | |
|---|---|---|---|
| 5,808,566 A | 9/1998 | Behr | |
| 5,818,447 A | 10/1998 | Wolf et al. | |
| 5,832,497 A | 11/1998 | Taylor | |
| 5,850,618 A * | 12/1998 | Suetsugu et al. | 701/210 |
| 5,870,552 A | 2/1999 | Dozier et al. | |
| 5,875,175 A | 2/1999 | Sherer et al. | |
| 5,908,465 A | 6/1999 | Ito et al. | |
| 5,933,811 A | 8/1999 | Angles et al. | |
| 5,937,162 A | 8/1999 | Funk et al. | |
| 5,966,695 A | 10/1999 | Melchione et al. | |
| 5,970,062 A | 10/1999 | Bauchot | |
| 5,978,799 A | 11/1999 | Hirsch | |
| 5,999,912 A | 12/1999 | Wodarz et al. | |
| 6,006,225 A | 12/1999 | Bowman et al. | |
| 6,009,462 A | 12/1999 | Birrell et al. | |
| 6,018,518 A | 1/2000 | Smallwood et al. | |
| 6,031,533 A | 2/2000 | Peddada et al. | |
| 6,049,776 A | 4/2000 | Donnelly et al. | |
| 6,055,510 A | 4/2000 | Henrick et al. | |
| 6,073,075 A | 6/2000 | Kondou et al. | |
| 6,085,244 A | 7/2000 | Wookey | |
| 6,091,777 A | 7/2000 | Guetz et al. | |
| 6,094,507 A | 7/2000 | Monden | |
| 6,101,485 A | 8/2000 | Fortenberry et al. | |
| 6,170,011 B1 | 1/2001 | Macleod Beck et al. | |
| 6,170,071 B1 | 1/2001 | Wheeler | |
| 6,188,398 B1 | 2/2001 | Collins-Rector et al. | |
| 6,222,825 B1 | 4/2001 | Mangin et al. | |
| 6,233,520 B1 | 5/2001 | Ito et al. | |
| 6,263,020 B1 | 7/2001 | Gardos et al. | |
| 6,275,575 B1 | 8/2001 | Wu | |
| 6,282,540 B1 | 8/2001 | Goldensher et al. | |
| 6,321,265 B1 | 11/2001 | Najork et al. | |
| 6,346,980 B1 | 2/2002 | Tani et al. | |
| 6,351,755 B1 | 2/2002 | Najork et al. | |
| 6,360,254 B1 | 3/2002 | Linden et al. | |
| 6,377,936 B1 | 4/2002 | Henrick et al. | |
| 6,397,219 B2 | 5/2002 | Mills | |
| 6,401,075 B1 | 6/2002 | Mason et al. | |
| 6,449,635 B1 | 9/2002 | Tilden, Jr. et al. | |
| 6,462,676 B1 | 10/2002 | Koizumi | |
| 6,466,940 B1 | 10/2002 | Mills | |
| 6,523,021 B1 * | 2/2003 | Monberg et al. | 707/2 |
| 6,539,080 B1 | 3/2003 | Bruce et al. | |
| 6,549,950 B2 | 4/2003 | Lytle et al. | |
| 6,556,919 B2 * | 4/2003 | Suzuki et al. | 701/208 |
| 6,560,243 B1 | 5/2003 | Mogul | |
| 6,578,022 B1 | 6/2003 | Foulger et al. | |
| 6,587,832 B1 | 7/2003 | Beck et al. | |
| 6,594,666 B1 | 7/2003 | Biswas et al. | |
| 6,606,613 B1 | 8/2003 | Altschuler | |
| 6,606,660 B1 | 8/2003 | Bowman-Amuah | |
| 6,618,747 B1 | 9/2003 | Flynn et al. | |
| 6,657,558 B2 | 12/2003 | Horita et al. | |
| 6,662,194 B1 | 12/2003 | Joao | |
| 6,668,281 B1 | 12/2003 | Ayyadurai | |
| 6,681,255 B1 | 1/2004 | Cooper et al. | |
| 6,694,353 B2 | 2/2004 | Sommerer | |
| 6,721,759 B1 | 4/2004 | Rising | |
| 6,721,784 B1 | 4/2004 | Leonard et al. | |
| 6,751,606 B1 | 6/2004 | Fries et al. | |
| 6,791,943 B1 | 9/2004 | Reynolds | |
| 6,829,780 B2 | 12/2004 | Kraft et al. | |
| 6,854,007 B1 | 2/2005 | Hammond | |
| 7,007,010 B2 | 2/2006 | Cooper | |
| 7,047,423 B1 | 5/2006 | Maloney et al. | |
| 7,065,555 B2 | 6/2006 | Foulger et al. | |
| 7,072,888 B1 | 7/2006 | Perkins | |
| 7,103,580 B1 | 9/2006 | Batachia et al. | |
| 7,401,122 B2 | 7/2008 | Chen | |
| 2001/0011226 A1 | 8/2001 | Greer et al. | |
| 2001/0039508 A1 | 11/2001 | Nagler et al. | |
| 2001/0042000 A1 | 11/2001 | Defoor, Jr. | |
| 2001/0047297 A1 | 11/2001 | Wen | |
| 2001/0054043 A1 | 12/2001 | Harlan | |
| 2002/0004733 A1 | 1/2002 | Addante | |
| 2002/0004753 A1 | 1/2002 | Perkowski | |
| 2002/0016730 A1 | 2/2002 | Foulger et al. | |
| 2002/0016809 A1 | 2/2002 | Foulger et al. | |
| 2002/0073343 A1 | 6/2002 | Ziskind et al. | |
| 2002/0082923 A1 | 6/2002 | Merriman et al. | |
| 2002/0103698 A1 | 8/2002 | Cantrell | |
| 2002/0147637 A1 | 10/2002 | Kraft et al. | |
| 2002/0152238 A1 | 10/2002 | Hayes | |
| 2002/0156779 A1 | 10/2002 | Elliott et al. | |
| 2003/0037158 A1 | 2/2003 | Yano et al. | |
| 2003/0046148 A1 | 3/2003 | Rizzi et al. | |
| 2003/0128297 A1 | 7/2003 | Chu | |
| 2003/0145100 A1 | 7/2003 | Marchetto et al. | |
| 2003/0229638 A1 | 12/2003 | Carpenter et al. | |
| 2004/0010484 A1 | 1/2004 | Foulger et al. | |
| 2004/0210589 A1 | 10/2004 | Cooper et al. | |
| 2004/0220821 A1 | 11/2004 | Ericcson et al. | |
| 2005/0171863 A1 | 8/2005 | Hagen | |
| 2005/0283503 A1 * | 12/2005 | Hancock et al. | 707/200 |
| 2005/0289005 A1 | 12/2005 | Ferber et al. | |
| 2006/0085263 A1 | 4/2006 | Greer et al. | |
| 2006/0129536 A1 | 6/2006 | Foulger et al. | |
| 2007/0016562 A1 | 1/2007 | Cooper | |
| 2007/0022170 A1 | 1/2007 | Foulger et al. | |
| 2007/0150804 A1 | 6/2007 | Foulger et al. | |
| 2007/0204219 A1 | 8/2007 | Foulger et al. | |

FOREIGN PATENT DOCUMENTS

| | | |
|---|---|---|
| JP | 07200509 A | 8/1995 |
| JP | 08221479 A | 8/1996 |
| JP | 09130861 | 5/1997 |
| JP | 2000 020421 | 1/2000 |
| WO | WO 97/07467 | 2/1997 |
| WO | PCT/US97/19719 A2 | 10/1997 |
| WO | PCT/US97/22151 | 12/1997 |
| WO | WO 98/20434 | 5/1998 |
| WO | WO 00/20975 | 4/2000 |
| WO | WO 00/25508 | 5/2000 |
| WO | WO 01/13069 A1 | 2/2001 |
| WO | WO 01/65426 A1 | 9/2001 |

OTHER PUBLICATIONS

The MD5 Message Digest Algorithm by R.Rivest MIT Laboratory for Computer Science and RSA Data Security, Inc. Apr. 1992.

Applied Cryptography Protocols, Algorithms, and Source Code Inc. Schier, Bruce 1996.

Google Launches Full Suite of Fully Automated, Highly Customizable Websearch Services Based on Company's Award-Winning Search Technology Business Wire, p. 0420 Apr. 4, 2000.

RSS Feeds From CNET News.com/CNET News.com http://news.com/2009-1090-980549.html?tag=ne.404 (downloaded May 15, 2006- 3 pgs).

http://www.weather.com/services/oap.html?from=servicesindex downloaded May 18, 2006.

Gauch, S. and Smith, John. "Query Reformulation Strategies for an Intelligent Search Intermediary" Proceedings of the AI Systems in Government Conference, IEEE Computer Society ISBN No. 0-8186-1934-1 pp. 65-71 (Mar. 27-31, 1989).

Hsiangchu, Lai et al. A System Architecture of Intelligent-Guided Browsing on the Web, 1998 IEEE, 1060-3425, 1-10.

Jin-gang Kim et al., Intelligent Information Recommend System on the Internet, 1999, IEEE.

Branscum, Deborah "Sites to Help Professional Workers Who Like to Go it Alone", New York Times, Oct. 14, 1999, [retrieved Jun. 23, 2005 from Proquest Direct, pp. 1-3.

Houston, Lori, "IC Planet: Running Perl in the Engine", www.oreilly.com Apr. 10, 2000 [retrieved May 23, 2005 from Google.com p. 1-2].

Clark, Don "E-Business Starting Gate" Wall Street Journal Apr. 24, 2000 [retrieved Jun. 23, 2005 from Proquest Direct p. 1-3].

IBM Technical Disclosure Bulletin, NN8905154, May 1989 2 pgs.

International Search report for U.S. Appl. No. PCT/US01 12648 Nov. 21, 2001, 6 pgs.

Anderson, D., "E-mail or Me-Mail?" The Industry Standard, IDG.net, Printed from http://www.thestandard/com/article/display/0,1151,12422,00.html, 4 pages (Mar. 6, 2000). cited by other.

Cross, R. and Nassef, A., "E-Mail Direct Marketing Comes of Age," Direct Marketing, Hoke Communications, vol. 62, No. 6, pp. 44-45 (Oct. 1999)- cited by other.

"Top Ten Strategies for Direct Email Success," Boldfish Corporation, Printed from http://www.boldfish.com/BF-emguide/top-ten.html, 7 pages (Jan. 1, 2000). cited by other.

English-Language Abstract of Japanese Patent Publication No. 2000020421, European Patent Office, 1 page (Jan. 21, 2000—Date of publication of application). cited by other.

International Search Report from PCT Application No. PCT/US01/13137, 7 pages, mailed Aug. 28, 2002. cited by other.

International Search Report from Application No. PCT/US01/13141, 7 pages, mailed Oct. 27th, 2003.

Sanad et al. Mobile cellular/GPS/satellite antennas with both single-band and dual-band, Antennas and Propagation Society International Symposium, Jul. 16-20, 2000. cited by examiner.

Nagy et al. Geographic Data Processing. ACM Computing Surveys. 1979, p. 139-181. cited by examiner.

International Search report for Application No. PCT/US01 12510 Apr. 18, 2001, 6 pgs mailed/Sep. 5, 2002.

Ju, J and Wang Y., "Scheduling PVM Tasks," XP000627434, Operating Systems Review (SIGOPS), ACM Headquarter, New York, NY, vol. 30, No. 3, Jul. 1, 1996, pp. 22-31.

"Mental Ray Specification," XP002195542, <http://www.id8media.com/3s_products/mental_ray2.htm>,[internet], retrieved on Apr. 8, 2002.

Taylor, A., "Press Release—Avid Announces New Release of softimageΛ3d 3.8sp2," XP002195543, <http://www.softimage.com/community/xsi/discuss/Archives/3dgames.archive.9907/msg0000.htm>, [internet], retrieved on Apr. 8, 2002.

Ganesh, Sathy, Google Groups, "Re: Group Scheduling Software for PC's and mac's", Sep. 22, 1994, Newsgroups: bit.listserv.novell.

Foulger, Michael G., et al. U.S. Appl. No. 09/551,746, filed Apr. 18, 2000 entitled "Method, System, and Computer Program Product for Propagating Remotely Configurable Posters of Host Site Content".

Antonioletti, Mario "Load Sharing Across Networked Computers", Dec. 1997, The University of Ediburgh, version 1.0, p. 1-34.

"404 Error page/ CNET News.com" http://news.com/2547-1%203-0-20-.xml (downloaded May 18, 2006) 3 pages.

International Preliminary Examination Report for PCT Application No. PCT/US01/13265, 8 pages, mailed Apr. 22nd, 2008.

* cited by examiner

SYSTEM AND METHOD FOR PROXIMITY SEARCHING POSITION INFORMATION USING A PROXIMITY PARAMETER

This application is a continuation of U.S. application Ser. No. 09/840,922, filed Apr. 25, 2001, now U.S. Pat. No. 7,007,010, which is incorporated herein in its entirety by reference and which claims the benefit of U.S. Provisional Application No. 60/199,551, filed Apr. 25, 2000.

BACKGROUND OF THE INVENTION

1. Field of the Invention

The present invention relates to computer networking and communication, including Web-based communications and commerce.

2. Related Art

A proximity search has utility in many computer and business related applications. A proximity search refers to a search that identifies any candidate geographical positions that are near a geographical position of interest. In one known application, each candidate geographical position can be represented by position field information associated with a database record. A conventional proximity search includes the computer implemented steps of (a) calculating a great circle separation distance between the position of interest and each database position, and then (b) comparing each separation distance to a proximity parameter or search range to determine which of the candidate position are near, that is, proximate, the position of interest. The great circle separation distance is the distance between two points on the surface of the Earth along a great circle or circumference of the Earth, and therefore represents the shortest distance between the two points on the surface of the Earth.

Because great circle separation distances are used, the above mentioned proximity search accurately identifies candidate positions within the search range of the position of interest. However, calculating the great circle separation distances is computationally intensive because of the relatively complex geometric calculations involved. Thus, proximity search accuracy is achieved at the expensive of a heavy computational burden associated with calculating great circle separation distances. In an application including hundreds of thousands, or even millions, of database positions, calculating a correspondingly large number of great circle separation distances disadvantageously imposes an onerous computational burden, and thus consumes valuable computer processing time.

Different applications require proximity searches having different characteristics. For example, an application that requires fast responses to user queries, correspondingly requires rapid proximity searches. Such an application may relax proximity search accuracy so as to increase computational efficiency and speed. One such application requires a time efficient proximity search of millions of candidate positions, as mentioned above. In another application, the search range or proximity parameter is in a format that is incompatible with a format of the position field information in the database, thus complicating the processing of a query requiring a proximity search.

Therefore, there is a need for a time efficient proximity search that identifies candidate geographical positions that are near a geographical position of interest. There is a related need for a proximity search that searches such candidate geographical position when represented by position field information associated with a database record.

There is also a need for a proximity search that identifies the candidate geographical positions within a search range, specified as a proximity parameter, of the position of interest. There is a related need for a proximity search capable of searching for the candidate positions when the proximity parameter and the position field information have incompatible formats.

There is a further need for a proximity search that is responsive to user queries.

SUMMARY OF THE INVENTION

The present invention provides a computer implemented proximity searcher that searches position field information (representing geographical positions) stored in database records, to identify such positions falling within a predetermined search range of a position of interest. The proximity searcher of the present invention reduces the computational burden associated with conventional proximity search routines, such as the great circle calculation mentioned above, so as to perform time efficient proximity searches to identify candidate geographical positions that are near the position of interest. The proximity searcher identifies the candidate geographical positions within a search range, specified as a proximity parameter, of the position of interest. The proximity parameter and the position field information can have incompatible formats. In one embodiment of the present invention, the proximity searcher is responsive to user queries.

The present invention provides a method of performing a proximity search, wherein the method includes the step of receiving a proximity parameter defining a search area around a predetermined position (the position of interest). A set of latitudes and longitudes approximating the search area are calculated based on the proximity parameter. The set of latitudes and longitudes are compared to position field information in a plurality of records stored in a database. The method determines which of the plurality of records include position information within the search area based on the comparison step.

In one embodiment, the proximity parameter is a search radius defining a circular search area centered around the predetermined position. The set of latitudes and longitudes are calculated to define a smallest square search area into which the circular search area can fit, and that approximates the proximity parameter defined circular search area. The method includes comparing a latitude and a longitude associated with each of the plurality of records to a latitude range and a longitude ranges covered by the smallest square search area to determine which of the plurality of records include position information within the square search area.

The present invention further provides a system and a computer program product for performing proximity searches in accordance with the above mentioned method of performing same.

Additional features and advantages of the present invention, as well as the structure and operation of various embodiments of the present invention, are described in detail below with reference to the accompanying drawings.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art make and use the invention.

DETAILED DESCRIPTION OF THE PREFERRED EMBODIMENTS

Figure 1:
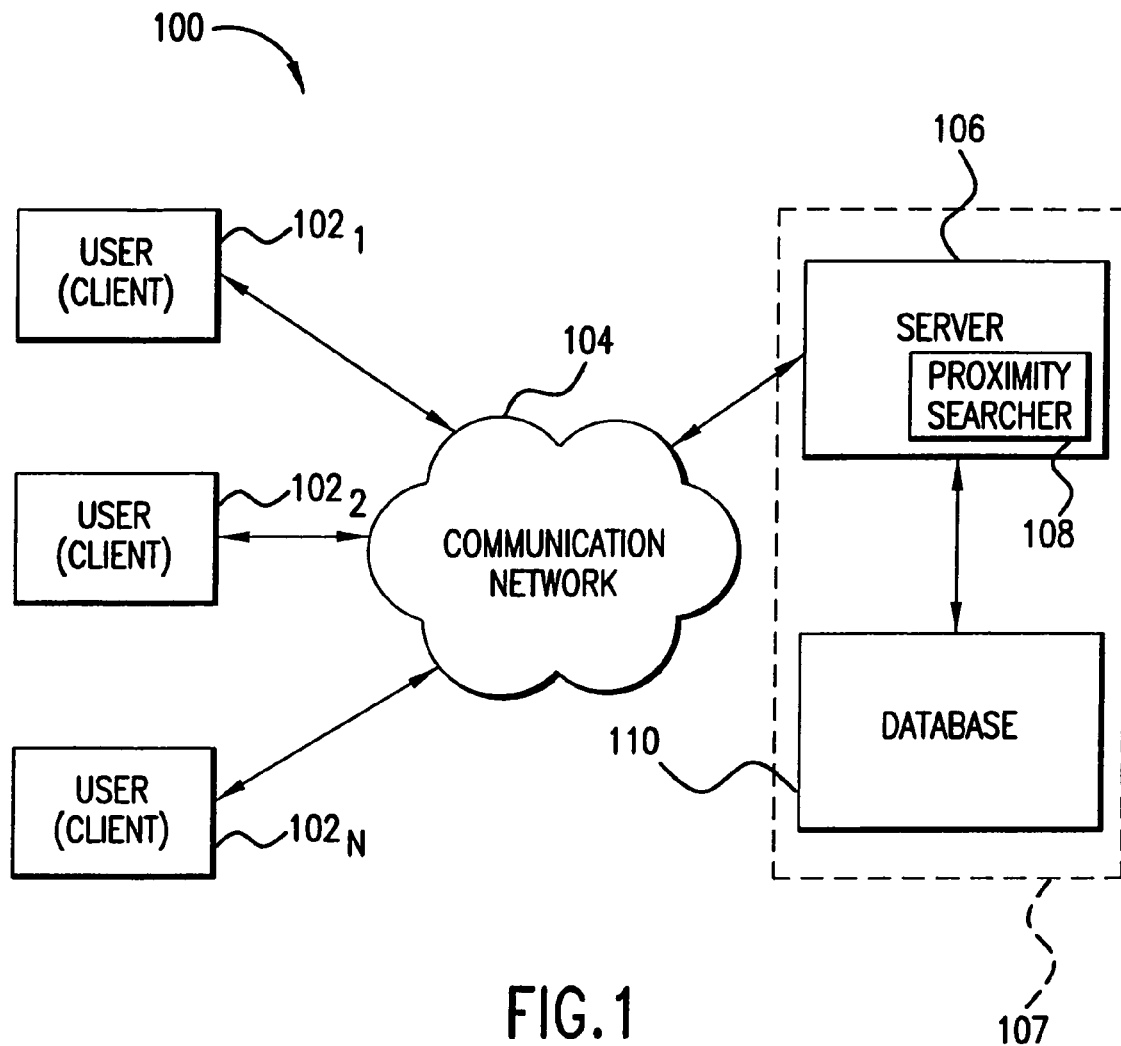
FIG. 1 is an illustration of an exemplary operating environment of the present invention.

FIG. 1 is an illustration of an exemplary operating environment 100 of the present invention. Operating environment 100 is also described in further detail below in connection with FIGS. 8A, 8B and 8C. In one embodiment, environment 100 is a client-server environment, and includes a plurality of user computers (also referred to as "clients") $102_1$, $102_2$ and $102_n$ coupled to a communication network 104. A client application, such as a browser, executes on each of the user computers 102. Communication network 104 can be any known communication network, including the Internet, local area networks (LANs), the Public Switch Telephone Network (PSTN), and so on.

A server computer (also referred to as a "server") 106 associated with a service provider 107 is also coupled to communication network 104. A server application executes on server 106, and includes a proximity searcher 108 for performing proximity searches, according to the present invention. Server 106 is coupled to a database 110 for storing position field information in records that can be proximity searched by proximity searcher 108. A method of proximity searching associated with proximity searcher 108 and database 110 is described in further detail below.

In a typical client-server application of the present invention, clients 102 can send information requests to server 106 via communication network 104. In response to an information request received from one of client computers 102, server106 formulates an information response and sends the information response back to the requesting client computer via communication network 104.

Figure 2:
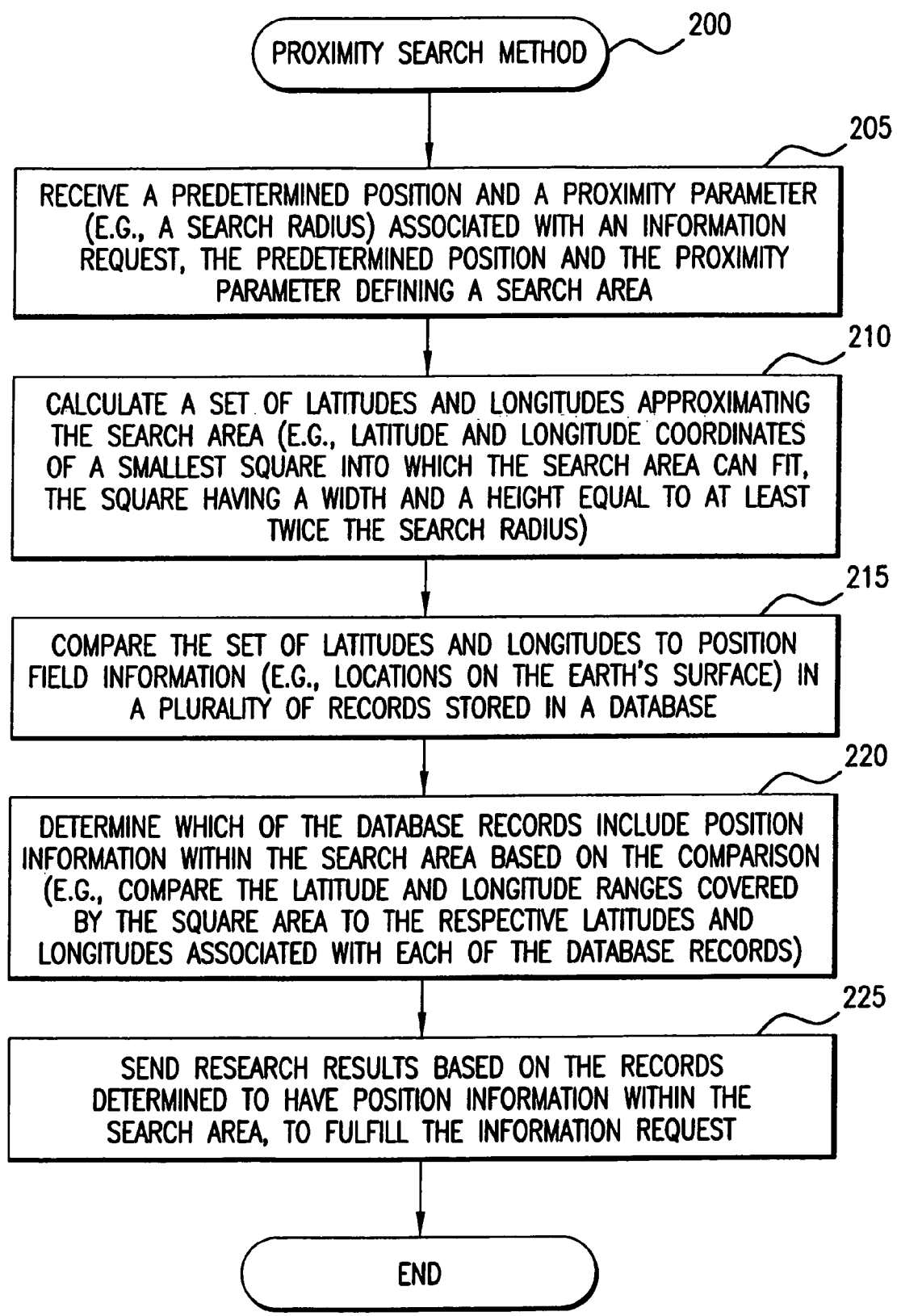
FIG. 2 is an illustration of a high level method performed by a proximity searcher, according to an embodiment of the present invention.

FIG. 2 is an illustration of a high level method 200 performed by proximity searcher 108, according to an embodiment of the present invention. Method 200 is initiated when one of client computers 102 sends an information request to server 106 requiring a proximity search. At a first step 205, the information request is received by server 106. The information request is associated with a proximity parameter defining a search range or area around (that is, encompassing) a position of interest (also referred to as a "predetermined position"). In one embodiment, the proximity parameter represents a search radius defining a circular search area centered around the predetermined position. The search radius can be in any length based units, such as meters, feet, miles, etc.

In an alternative embodiment, method 200 is initiated when a computer process executing on server 106, for example, sends a search request to proximity searcher 108 requesting a proximity search. The search request includes the proximity parameter and is associated with a position of interest, as mentioned above.

At a next step 210, a set of latitudes and longitudes approximating the circular search area are calculated. In one embodiment, latitudes and longitudes are calculated to define a smallest square search area into which the circular search area can fit. The square search area has a width and a height equal to at least twice the search radius (that is, equal to a search diameter of the circular search area).

At a next step 215, the calculated set of latitudes and longitudes are compared to position field information, specifying locations on the surface of the Earth, in a plurality of records stored in database 110. In one embodiment, the position field information comprises latitude and longitude information, and step 215 includes comparing the latitude and longitude ranges covered by the square search area to the respective latitudes and longitudes associated with each of the records in database 110. Mapping the circular search area to a set of latitudes and longitudes using the proximity parameter prior to comparison step 215 advantageously leads to a relatively straight forward and time efficient comparison of latitude and longitude information at step 215. In other words, mapping step 210 is a technique for converting the proximity parameter (and thus, the circular area defined thereby) into a format compatible with database position field information against which the proximity parameter must be compared. Step 210 is a "one-time" mapping step that advantageously avoids converting each of the latitudes and longitudes—in perhaps millions of database records—to some other format.

At a next step 220, it is determined which of the database records include position field information within the circular search area based on comparison step 215. In one embodiment, position field information (database positions) falling within the square search area are determined to be within the circular search area. It is to be understood that other determining criteria could be used to determine whether a database position falls within the circular search area. For example, database positions falling within a predetermined distance (that is, within a predetermined range of latitudes and longitudes) of the square search area could be determined to be within the circular search area.

At a next step 225, a search result is sent to the requesting client to fulfill the information request received at step 205. If method 200 was initiated by a search request from a process executing on server 106, proximity searcher 108 returns the search result to the requesting process. In either case, the search result is based on the database records determined to have position information within the circular search area at step 220.

Figure 3:
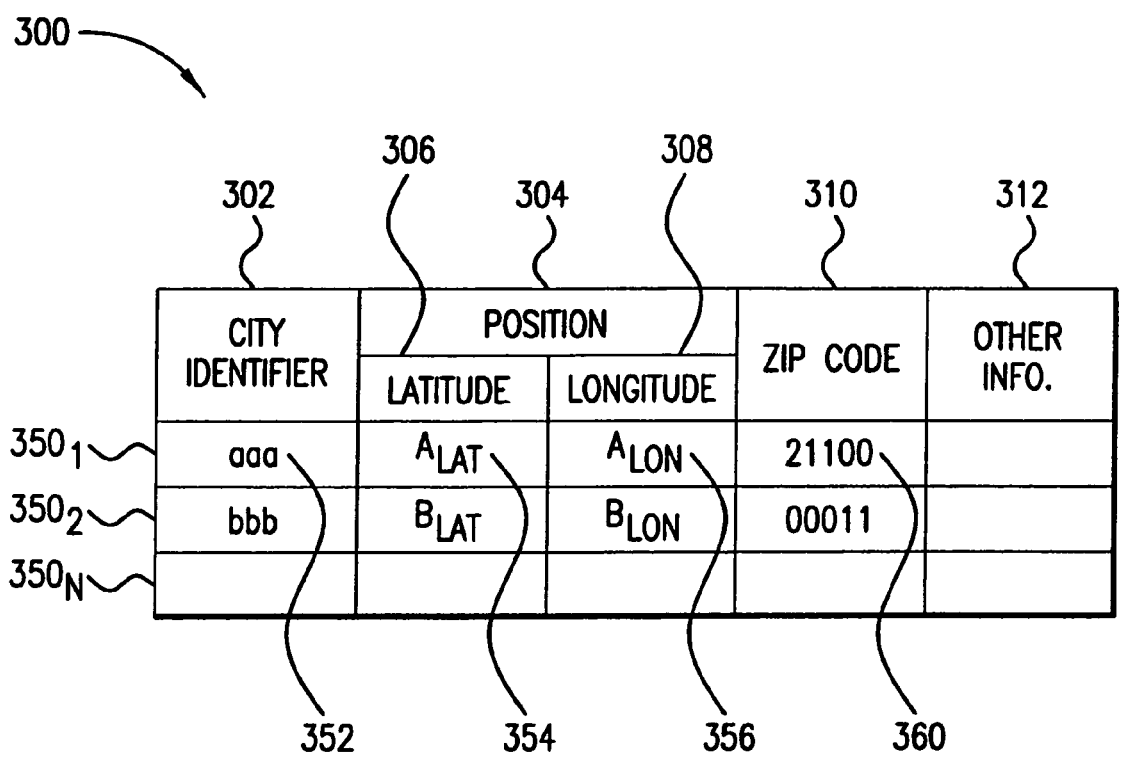
FIG. 3 is an illustration of an exemplary record table stored in a database of FIG. 1, and accessible to the proximity searcher, according to the present invention.

The above described method is now described in further detail in the context of an example scenario, wherein service provider 107 provides a service for matching an employer having job opportunities (also known as "job postings") with a list of prospective employee candidates who reside near or "proximate" the employer. In the example scenario, database 110 is populated with employee candidate resume information. FIG. 3 is an illustration of an exemplary record table 300 stored in database 110. The information stored in table 300 includes information taken from candidate resumes. Table 300 includes a city column 302 for listing city or town identifiers representing candidate residences. A position column 304 is provided for listing the positions or locations of the candidate cities listed in column 302. Position column 304 is further subdivided into a latitude column 306 and a longitude column 308 for respectively listing the candidate city positions in terms of latitude and longitude. Table 300 optionally includes a city zip code column 310 and an "other" column 312 for listing any other desirable information associated with employee candidates.

Table 300 includes a plurality of rows $350_1$, $350_2$ and $350_n$. Each of the rows 350 corresponds to a record for storing candidate information in database 110. For example, row $350_1$ includes a field 352 for storing a city identifier "aaa", fields 354 and 356 (referred to as "position fields") for respectively storing a latitude $A_{LAT}$ and a longitude $A_{LON}$ (collectively referred to as "position field information") of city aaa, and a field 360 for storing a zip code "21100" of city aaa. In one embodiment, the latitudes and longitudes are represented in radians.

In the example scenario, an employer "XYZ" has job openings at an employer location, for example, in a city within the United States. Using one of client computers 102, employer XYZ submits an information request (in this case, a search request) to server 106 to identify all of the employee candidates residing within a predetermined search radius $R_S$ of the employer location. In an alternative scenario, an employee candidate, instead of the employer, submits an information request to identify any job postings proximate the candidate. An example search radius $R_S$ associated with the search request may be 50 or 75 miles. In one embodiment the employer can specify search radius $R_S$ (that is, the proximity parameter) in the information request. Alternatively, one or more default proximity parameters can be provided by server 106 in response to the information request.

Figure 4:
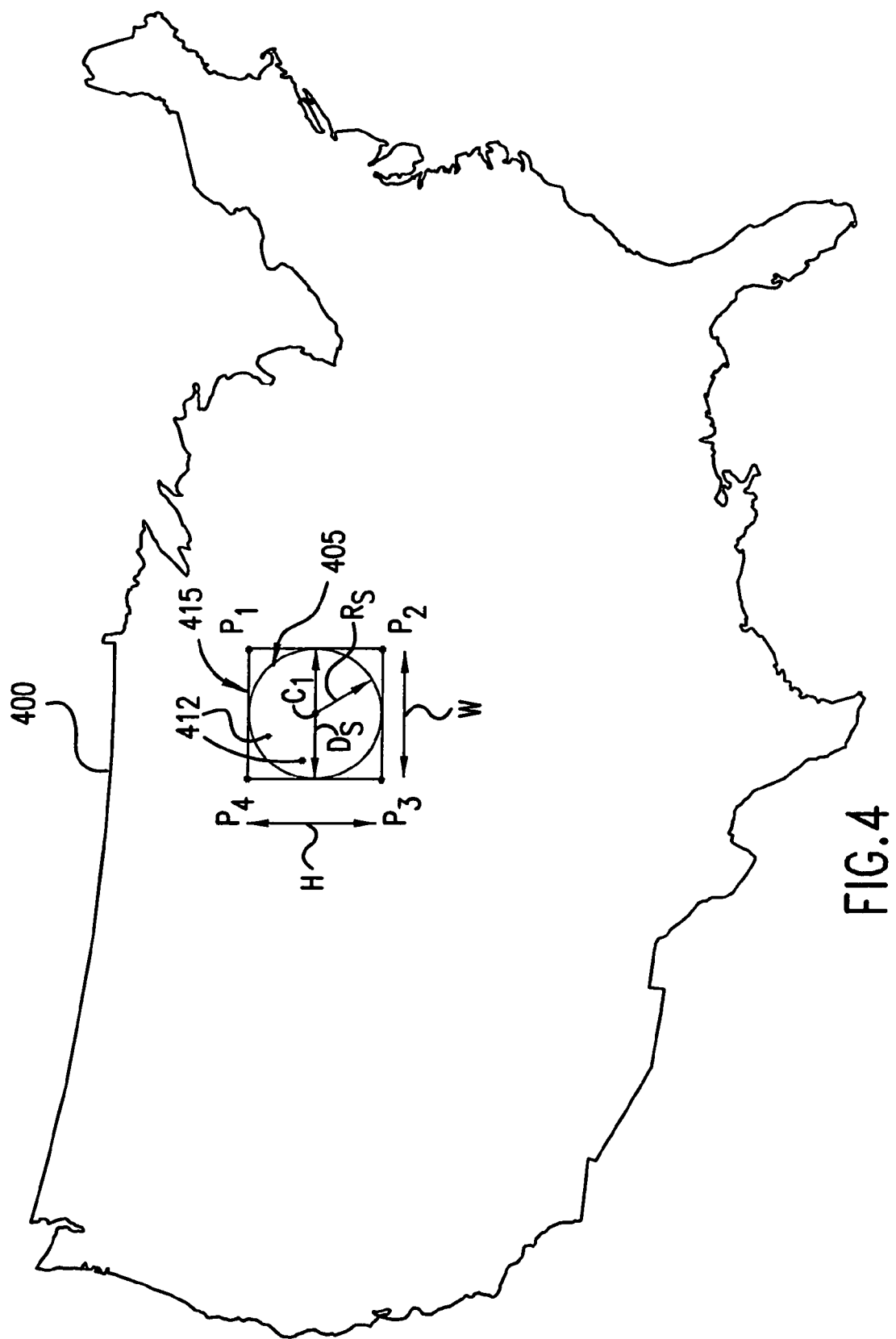
FIG. 4 is a diagrammatic illustration of a search request overlaid on a map-outline of the United States, according to the present invention.

In the information request, the employer location can be expressed as an entire address with a zip code, or just the zip code where employer XYZ is located. FIG. 4 is an illustration of a map-outline of the United States 400, wherein the information request is diagrammatically illustrated. Using a commercially available utility program at server 106, the zip code of company XYZ in the information request is easily mapped to a representative position $C_1$ expressed in terms of, for example, a latitude $C_{1LAT}$ and a longitude $C_{1LON}$. Via the information request, employer XYZ wishes to identify any employee candidates residing within a circular search area 405 having a radius $R_S$ and centered around location $C_1$ ($C_{1LAT}$, $C_{1LON}$). Candidates may reside in cities or towns located, for example, at positions 412 within circular search area 405.

Still with reference to FIG. 4, after receiving the above mentioned information request, proximity searcher 108 calculates a set of latitudes and longitudes corresponding to four corner points $P_1$ ($P_{1LAT}$, $P_{1LON}$), $P_2$ ($P_{2LAT}$, $P_{2LON}$), $P_3$ ($P_{3LAT}$, $P_{3LON}$), and $P_4$ ($P_{4LAT}$, $P_{4LON}$) defining a smallest square search area 415 into which circular search area 405 can fit. In other words, proximity searcher 108 maps circular search area 405 to square search area 415 defined by corner points $P_1$-$P_4$ in terms of latitude and longitude. As depicted in FIG. 4, corner points $P_1$, $P_2$, $P_3$ and $P_4$ respectively correspond to a North-East corner, a South-East corner, a South-West corner and a North-West corner of square search area 415. Square search area 415 has a width W and a height H, each equal to a diameter $D_S$ (referred to as search diameter $D_S$) of circular search area 405.

Figure 5:
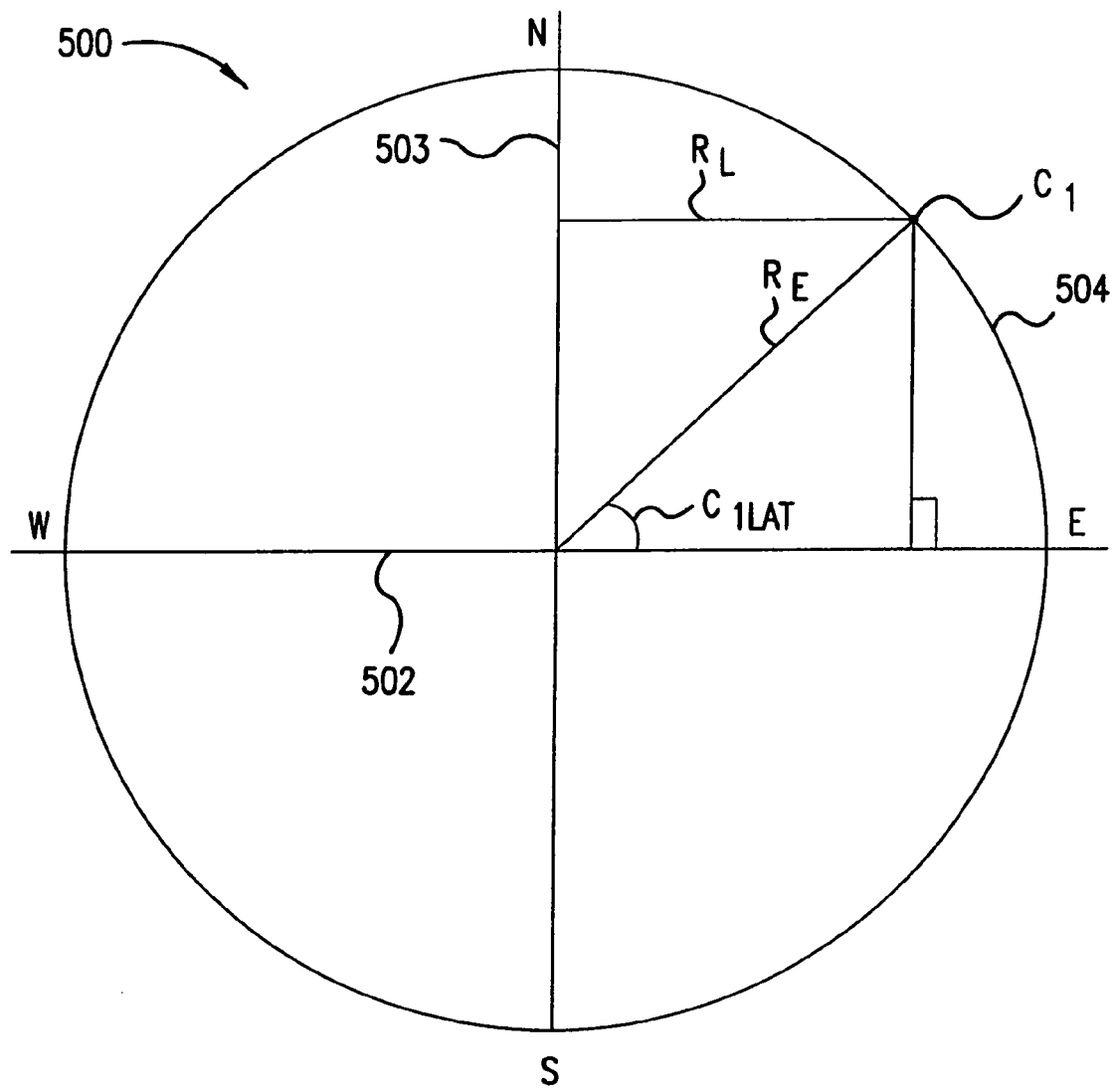
FIG. 5 is a cross sectional view of the Earth, wherein a search location of FIG. 4 is depicted at a latitude in the Northern Hemisphere.

The step of calculating the set of latitudes and longitudes corresponding to corner points $P_1$ through $P_4$ is now described in further detail with reference to FIGS. 5-8. FIG. 5 is a cross sectional view of the Earth 500, wherein an axis line 502 lying in an equatorial plane and a North-South axis line 503 are depicted. Location $C_1$ is depicted at a latitude $C_{1LAT}$ in the Northern Hemisphere. $R_E$ represents the radius of the Earth, and $R_L$ represents the radius of a latitude ring (not shown) at latitude $C_{1LAT}$ and coinciding with location $C_1$. Location $C_1$ also lies on a longitude ring 504 defining a great circle about the surface of the earth. Since circular and square search areas 405 and 415 are small compared to the curvature of the Earth's surface, search areas 405 and 415 approximate planar areas. Thus, for purposes of the present invention, search areas 405,415 can be considered as either planar or non-planar areas.

Figure 6:
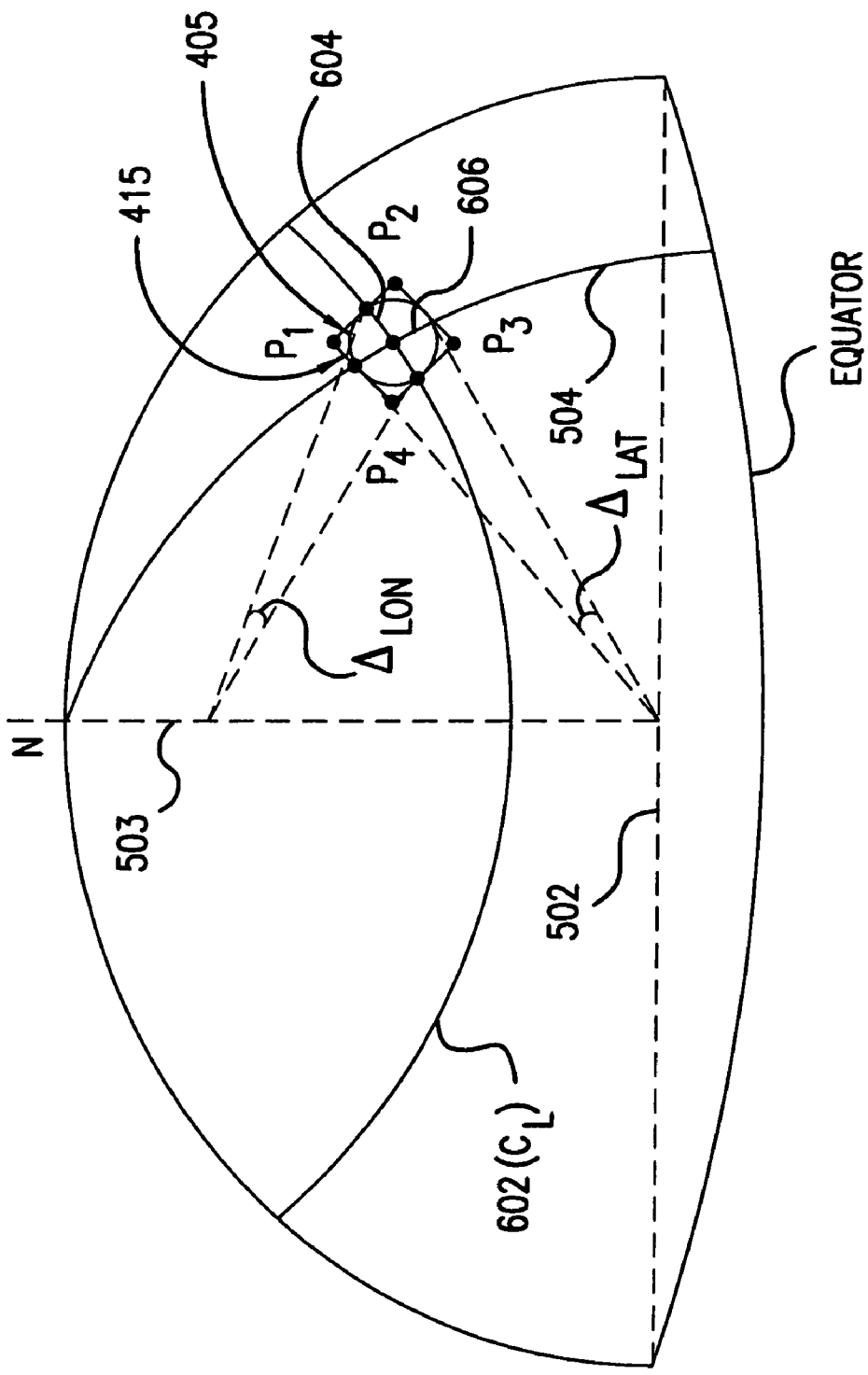
FIG. 6 is a perspective view of the Northern Hemisphere depicted in FIG. 5.

FIG. 6 is a perspective view of the Northern Hemisphere depicted in FIG. 5. The elements depicted in FIG. 6 are not drawn to scale. Circular and square search areas 405 and 415 are centered around location $C_1$ in the Northern Hemisphere. A latitude ring 602 at latitude $C_{1LAT}$ has a circumference $C_L$ passing through both the circular and square search areas 405, 415. The curvature of latitude ring 602 is highly exaggerated in FIG. 6. Circumference $C_L$ of latitude ring 602 is represented by the following equations:

$C_L = 2\pi R_L$, where $R_L = R_E \cdot \cos(C_{1LAT})$ (from FIG. 5), and therefore $C_L = 2\pi(R_E \cdot \cos(C_{1LAT}))$ A segment 604 of latitude ring 602, having a length equal to search diameter $D_S$ (and the width W of square search area 415), bisects the height of square search area 415. Segment 604 subtends an angular width $\Delta_{LON}$ at axis line 503. $\Delta_{LON}$ represents a longitudinal angular measure or extent of both circular and square search areas 405 and 415. $\Delta_{LON}$ is represented by the following equation:

$\Delta_{LON} = 2\pi(D_S/C_L)$ radians

A segment 606 of longitude ring 504, also having a length equal to $D_S$ (and the height W of square 415), bisects the width of square search area 415. Segment 606 subtends an angular height $\Delta_{LAT}$ at an intersection between axes 502 and 503. $\Delta_{LAT}$ represents an latitudinal angular measure of both circular and square search areas 405 and 415. $\Delta_{LAT}$ is represented by the following equation:

$\Delta_{LAT} = 2\pi(D_S/C_E)$ radians

The latitude and longitude coordinates defining the four corners $P_1$ through $P_4$ of square search area 415 are calculated based on $C_1$ ($C_{1LAT}$, $C_{1LON}$), $\Delta_{LAT}$, and $\Delta_{LON}$, according to the equations below.

Figure 7:
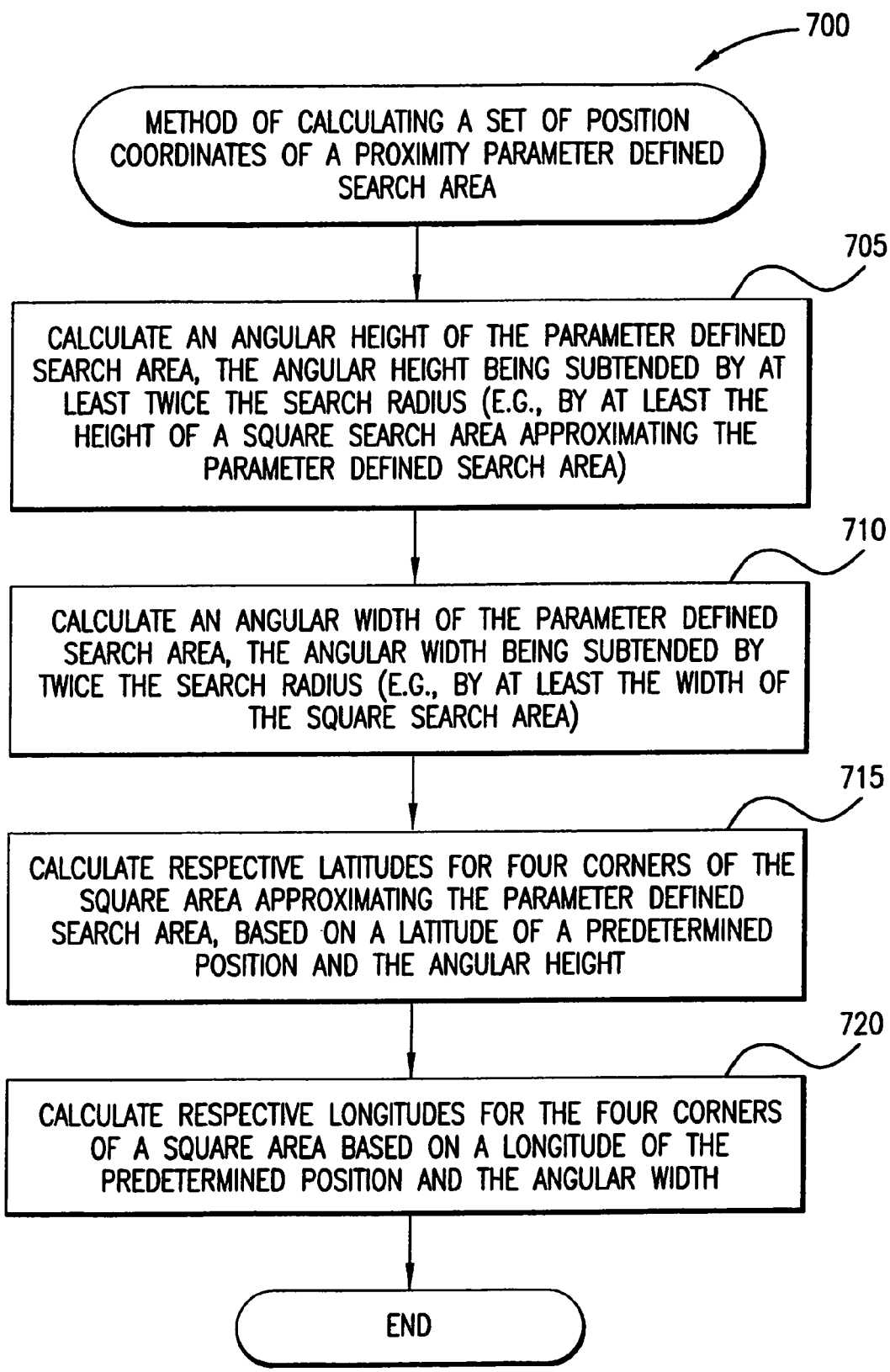
FIG. 7 is an illustration of an exemplary series of detailed method steps for calculating a set of latitude and longitudes corresponding to a search area approximating a proximity parameter defined search area.

For $P_1$: $P_{1LAT} = C_{1LAT} + (\Delta_{LAT}/2)$, and $P_{1LON} = C_{1LON} - (\Delta_{LON}/2)$ For $P_2$: $P_{2LAT} = C_{1LAT} - (\Delta_{LAT}/2)$, and $P_{2LON} = C_{1LON} - (\Delta_{LON}/2)$ For $P_3$: $P_{3LAT} = C_{1LAT} - (\Delta_{LAT}/2)$, and $P_{3LON} = C_{1LON} + (\Delta_{LON}/2)$ For $P_4$: $P_{4LAT} = C_{1LAT} + (\Delta_{LAT}/2)$, and $P_{4LON} = C_{1LON} + (\Delta_{LON}/2)$ FIG. 7 is an illustration of an exemplary series of detailed method steps 700 summarizing the above described method of calculating the set of latitude and longitudes corresponding to positions P1 through P4 defining square search area 415. Note that the series of method steps 700 expands on step 210 described above in connection with FIG. 3. With reference to FIG. 7, a first step 705 includes calculating an angular height (for example, $\Delta_{LAT}$) of a proximity parameter defined search area (for example, circular area 405). The angular height is subtended by at least a search diameter (for example, $D_S$), and corresponds to a height of a search area (for example, square search area 415) approximating the parameter defined search area (also referred to as an "approximate search area").

At a next step 710, an angular width (for example, $\Delta_{LON}$) of the parameter defined search area is calculated. The angular width is subtended by the search diameter, and corresponds to a width of the approximate search area. At a next step 715, latitudes associated with a set of corner positions defining the approximate search area are calculated based on the angular height of the approximate search area and a latitude of a predetermined center position (for example, $C_1$) about which the parameter defined search area is centered. At a next step 720, longitudes associated with the set of corner positions are calculated based on the angular width of the approximate search area and a longitude of the center position.

Referring again to step 220, described previously in connection with FIG. 2, once the circular search area has been mapped to the approximate search area (for example, square search area 415) defined in terms of longitude and latitudes, a straightforward comparison can be made between (a) the latitudes and longitudes defining the approximate search area, and (b) the latitude and longitude position field information (that is, database positions) in database records 350, to determine whether the database positions fall within the approximate search area. For example, with reference to the example scenario, a database position falls within the approximate search area 415 when the following two conditions are met:

(a) the database position latitude is between approximate square search area latitudes $P_{1LAT}$ (or $P_{4LAT}$) and $P_{2LAT}$ (or $P_{3LAT}$); and at the same time, (b) the database position longitude is between approximate square search area longitudes $P_{1LON}$ (or $P_{2LON}$) and $P_{3LON}$ (or $P_{4LON}$).

Only three of the four positions $P_1$ through $P_4$ are necessary to test the above two conditions. Thus, to save computing time, only three of the four positions are calculated in one embodiment (for example, $P_1$ ($P_{1LAT}$, $P_{1LON}$), $P_2$ ($P_{2LAT}$, $P_{2LON}$) and $P_3$ ($P_{3LAT}$, $P_{3LON}$)).

In the above described embodiment, at least three corner positions define the extent of square search area 415. However, other positions on a perimeter of the square search area can be calculated to define the extent of the square search area. For example, the square search area can be defined by a first position and a second position respectively bisecting the left (West) side and right (East) sides of the square search area, together with a third position and a fourth position respectively bisecting the top (North) and bottom (South) sides of the square search area. In other words, the first, second, third, and fourth positions define a cross centered at $C_1$. In this configuration, all four positions are necessary to define the range of latitudes and longitudes covered by the square search area. Other position combinations that would be apparent to one skilled in the art are possible.

In another embodiment, the circular search area can be mapped to a non-square shaped, approximate search area defined by a set of latitudes and longitudes. For example, the circular search area can be mapped to a rectangularly shaped search area having different height and a width dimensions. Alternatively, the circular search area may be mapped to a parallelogram, a rhombus, or any other conveniently shaped search area, so long as the shape of the approximate search area facilitates a straight forward comparison between latitudes and longitudes, as described above.

Example Network Environment

The present invention can be implemented in any communication network, such as, the Internet, which supports interactive services and applications. In particular, the present invention can be implemented in any Web service, preferably a Web service supporting secure transactions, such as, the Secure Socket Layer (SSL) protocol and/or using a Secure HyperText Transport Protocol (S-HTTP). In one example, the present invention is implemented in a multi-platform (platform independent) programming language such as Java. Java-enabled browsers are used, such as, Netscape, Hotjava, and Microsoft Explorer browsers. Active content Web pages can be used. Such active content Web pages can include Java applets or ActiveX controls, or any other active content technology developed now or in the future. The present invention, however, is not intended to be limited to Java or Java-enabled browsers, and can be implemented in any programming language and browser, developed now or in the future, as would be apparent to a person skilled in the art given this description. Further, the present invention is not intended to be limited to a Web-based implementation or environment and can be implemented in any communication network now or in the future, as would be apparent to a person skilled in the art given this description. Even further, the present invention can operate in the absence of a network, for example, on a computer not connected with a network.

Figure 8A:
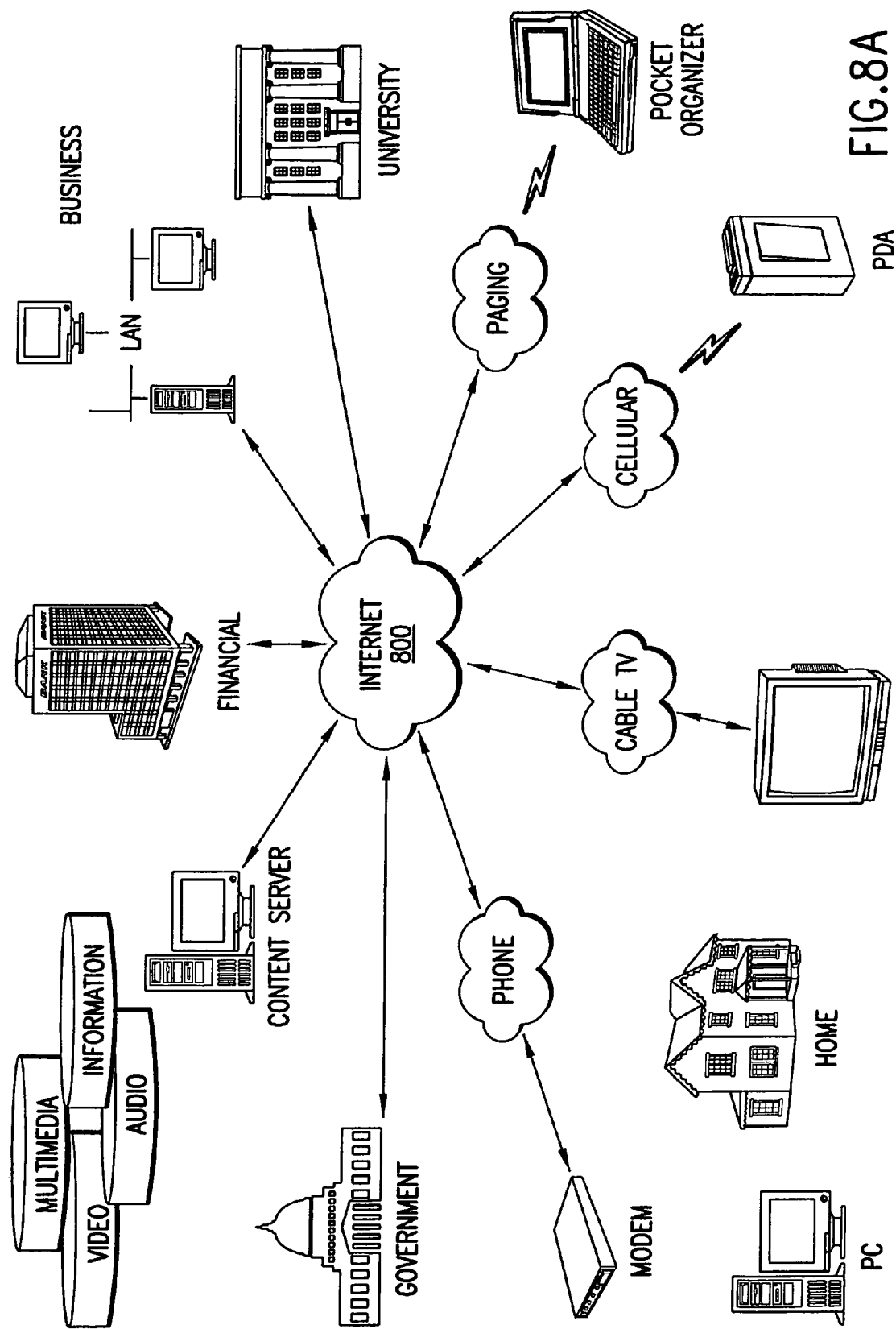
FIG. 8A is a diagram of an example internetwork environment according to the present invention.

FIG. 8A is a diagram of an example internetwork environment according to the present invention. FIG. 8A shows a communication network or combination of networks (Internet) 800 (corresponding to communication network 104 of FIG. 1) which can support the invention. Internet 800 consists of interconnected computers which supports communication between many different types of users including businesses, universities, individuals, government, and financial institutions. Internet 800 supports many different types of communication links implemented in a variety of architectures. For example, voice and data links can be used including phone, paging, cellular, and cable TV (CATV) links. Terminal equipment can include local area networks, personal computers with modems, content servers of multi-media, audio, video, and other information, pocket organizers, Personal Data Assistants (PDAs), and set-top boxes.

Figure 8B:
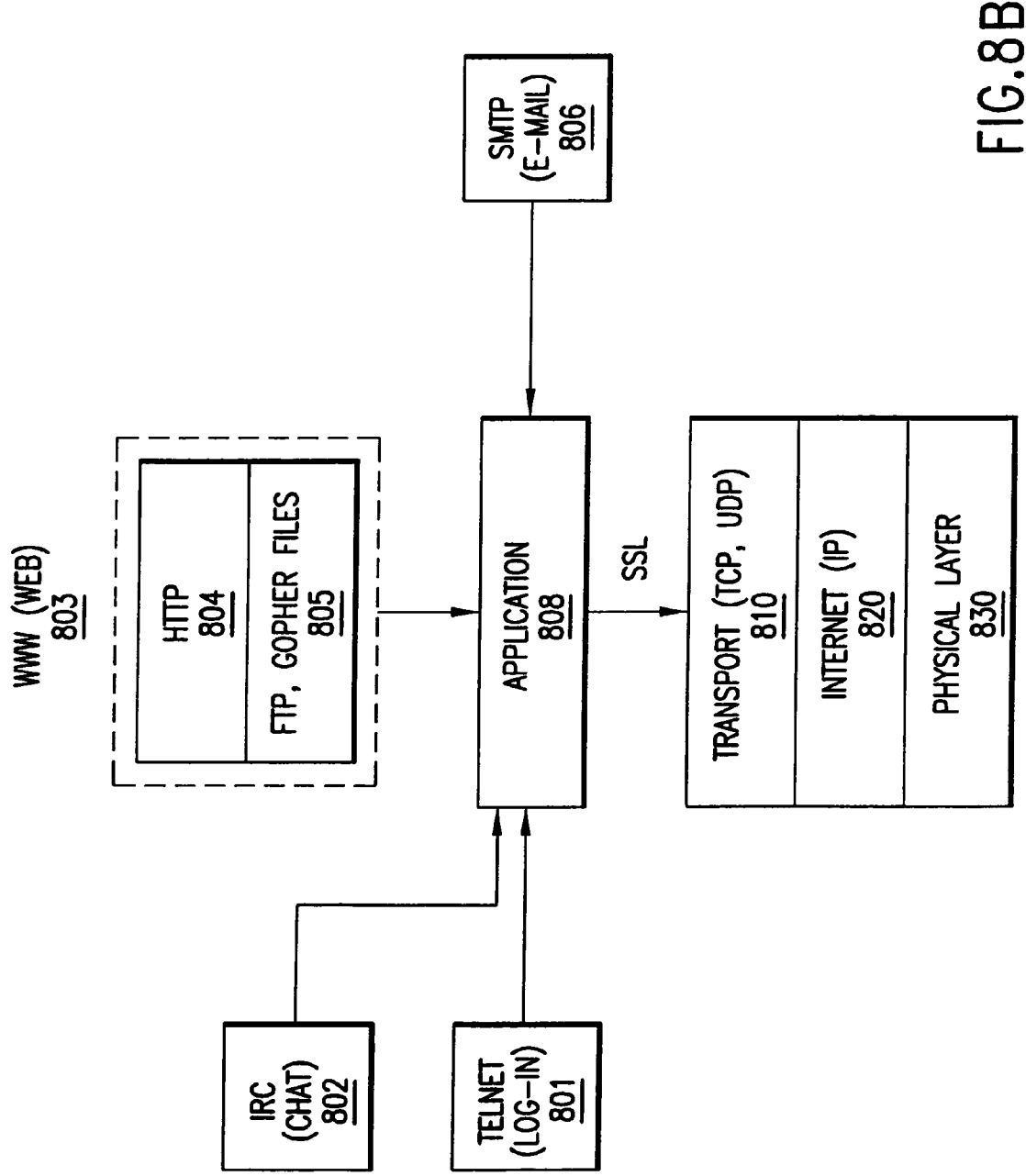
FIG. 8B is an illustration of a simplified four-layered communication model supporting Web commerce including an application layer, a transport layer, an Internet layer, and a physical layer.

Communication over a communication network such as, Internet 800, is carried out through different layers of communication. FIG. 8B shows a simplified four-layered communication model supporting Web commerce including an application layer 808, transport layer 810, Internet layer 820, physical layer 830. As would be apparent to a person skilled in the art, in practice, a number of different layers can be used depending upon a particular network design and communication application. Application layer 808 represents the different tools and information services which are used to access the information over the Internet. Such tools include, but are not limited to, telenet log-in service 801, IRC chat 802, Web service 803, and SMTP (Simple Mail Transfer Protocol) electronic mail service 806. Web service 803 allows access to HTTP documents 804, and FTP and Gopher files 805. A Secure Socket Layer (SSL) is an optional protocol used to encrypt communications between a Web browser and Web server.

Description of the example environment in these terms is provided for convenience only. It is not intended that the invention be limited to application in this example environment. In fact, after reading the following description, it will become apparent to a person skilled in the relevant art how to implement the invention in alternative environments.

Example Computer System

Figure 8C:
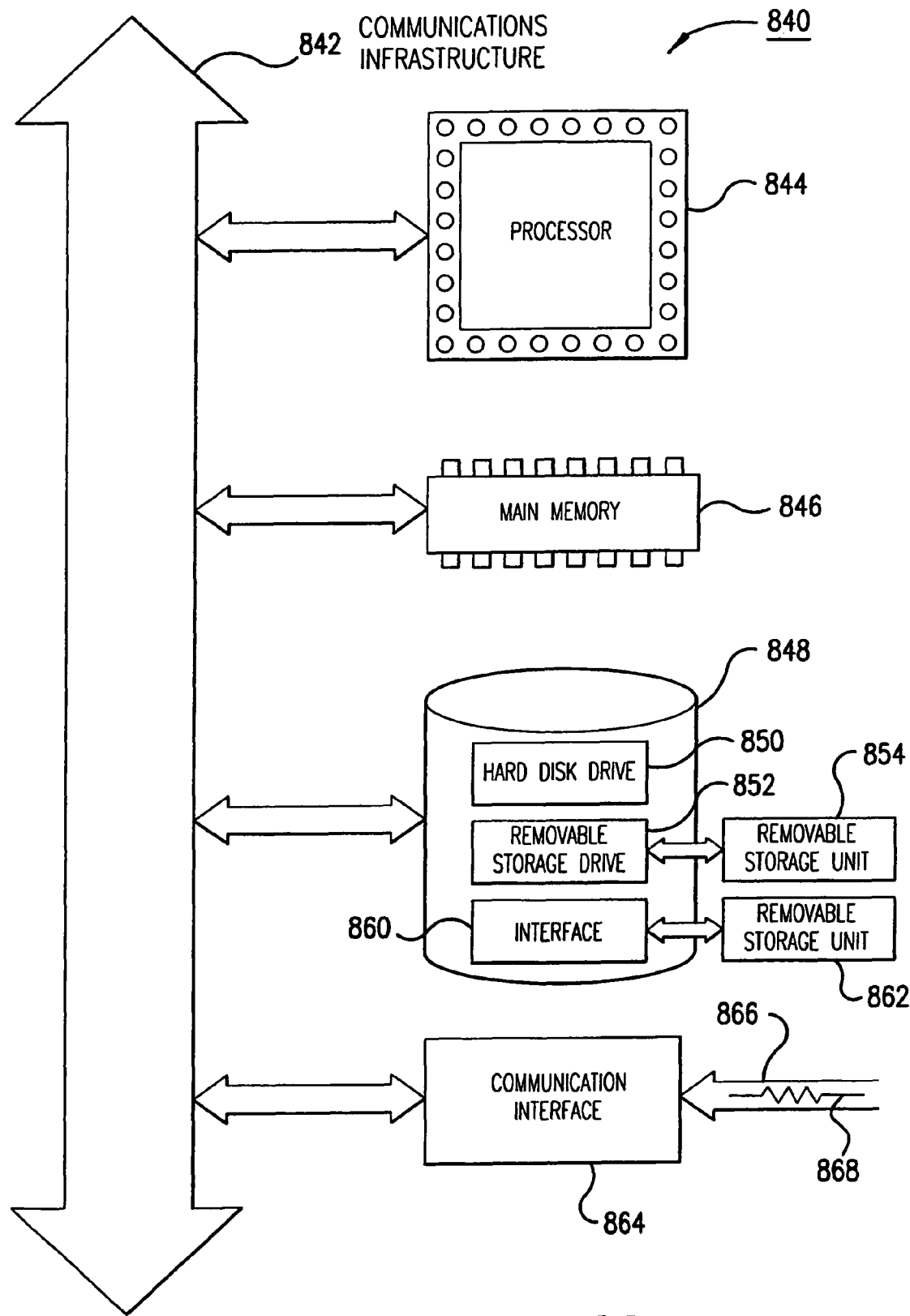
FIG. 8C is an exemplary computer architecture on which the present invention can be implemented.

An example of a computer system 840 is shown in FIG. 8C. The computer system 840 represents any single or multi-processor computer. Single-threaded and multi-threaded computers can be used. Unified or distributed memory systems can be used.

Computer system 840 includes one or more processors, such as processor 844. In one embodiment, computer system 840 corresponds to server 106 of FIG. 1, and proximity searcher 108 comprises one or more processors 844 that can execute software implementing methods 200 and 700 as described above. Each processor 844 is connected to a communication infrastructure 842 (e.g., a communications bus, cross-bar, or network). Various software embodiments are described in terms of this exemplary computer system. After reading this description, it will become apparent to a person skilled in the relevant art how to implement the invention using other computer systems and/or computer architectures.

Computer system 840 also includes a main memory 848, preferably random access memory (RAM), and can also include a secondary memory 850. The secondary memory 850 can include, for example, a hard disk drive 852 and/or a removable storage drive 854, representing a floppy disk drive, a magnetic tape drive, an optical disk drive, etc. The removable storage drive 854 reads from and/or writes to a removable storage unit 858 in a well known manner. Removable storage unit 858 represents a floppy disk, magnetic tape, optical disk, etc., which is read by and written to by removable storage drive 854. As will be appreciated, the removable storage unit 858 includes a computer-readable storage medium having stored therein computer software and/or data.

In alternative embodiments, secondary memory 860 may include other similar means for allowing computer programs or other instructions to be loaded into computer system 840. Such means can include, for example, a removable storage unit 862 and an interface 860. Examples can include a program cartridge and cartridge interface (such as that found in video game devices), a removable memory chip (such as an EPROM, or PROM) and associated socket, and other removable storage units 862 and interfaces 860 which allow software and data to be transferred from the removable storage unit 862 to computer system 840.

Computer system 840 can also include a communications interface 864. Communications interface 864 allows software and data to be transferred between computer system 840 and external devices via communications path 866. Examples of communications interface 864 can include a modem, a network interface (such as Ethernet card), a communications port, etc. Software and data transferred via communications interface 864 are in the form of signals which can be electronic, electromagnetic, optical or other signals capable of being received by communications interface 864, via communications path 866. Note that communications interface 864 provides a means by which computer system 840 can interface to a network such as the Internet.

The present invention can be implemented using software running (that is, executing) in an environment similar to that described above with respect to FIG. 8A. In this document, the term "computer program product" is used to generally refer to removable storage unit 858, a hard disk installed in hard disk drive 852, or a carrier wave carrying software over a communication path 866 (wireless link or cable) to communication interface 864. A computer-readable medium can include magnetic media, optical media, or other recordable media. These computer program products are means for providing software to computer system 840.

Computer programs (also called computer control logic) are stored in main memory 848 and/or secondary memory 850. Computer programs can also be received via communications interface 854. Such computer programs, when executed, enable the computer system 840 to perform the features of the present invention as discussed herein. In particular, the computer programs, when executed, enable the processor 844 to perform the features of the present invention, as related to proximity searching. Accordingly, such computer programs represent controllers of the computer system 840.

The present invention can be implemented as control logic in software, firmware, hardware or any combination thereof. In an embodiment where the invention is implemented using software, the software may be stored in a computer program product and loaded into computer system 840 using removable storage drive 854, hard drive 850, or interface 860. Alternatively, the computer program product may be downloaded to computer system 840 over communications path 866. The control logic (software), when executed by the one or more processors 844, causes the processor(s) 844 to perform the functions of the invention as described herein.

In another embodiment, the invention is implemented primarily in firmware and/or hardware using, for example, hardware components such as application specific integrated circuits (ASICs). Implementation of a hardware state machine so as to perform the functions described herein will be apparent to persons skilled in the relevant art(s).

CONCLUSION

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method for performing a proximity search, comprising:
receiving, at a computing device, data representing a geographical position and data representing a distance;
processing the data using the computing device, including:
determining a first latitude north of the geographical position by an amount of the distance,
determining a second latitude south of the geographical position by the amount of the distance,
determining a first longitude west of the geographical position based on the amount of the distance and a mathematical function of a latitude of the geographical position, and determining a second longitude east of the geographical position based on the amount of the distance and the mathematical function of the latitude of the geographical position;

determining at the computing device whether a place of interest is proximate to the geographical position based on a determination that a latitude of the place of interest is between the first latitude and the second latitude and a longitude of the place of interest is between the first longitude and the second longitude; and outputting a result of the proximity determination from the computing device.

2. The method of claim 1, further comprising:
presenting, at an output device, a name of the place of interest if the latitude of the place of interest is between the first latitude and the second latitude and the longitude of the place of interest is between the first longitude and the second longitude.

3. The method of claim 2, further comprising:
presenting, at the output device, additional information associated with the place of interest.

4. The method of claim 1, further comprising:
inputting the data representing the geographical position and the data representing the distance using an input device.

5. The method of claim 1, wherein
said determining the first latitude north of the geographical position comprises determining a sum of a latitude, in radians, of the geographical position added to a first quotient, the first quotient being equal to a first product divided by a measure of a circumference of the Earth, the first product being equal to the distance multiplied by two multiplied by pi, said determining the first latitude south of the geographical position comprises determining a difference of the first quotient subtracted from the latitude, in radians, of the geographical position, said determining the first latitude west of the geographical position comprises determining a sum of a longitude, in radians, of the geographical position added to a second quotient, the second quotient being equal to the first product divided by a second product, the second product being equal to a measure of a radius of the Earth multiplied by two multiplied by pi multiplied by a cosine of the latitude of the geographical position, and said determining the first latitude east of the geographical position comprises determining a difference of the second quotient subtracted from the longitude, in radians, of the geographical position.

6. The method of claim 1, wherein the mathematical function comprises a cosine function of the latitude of the geographical position.

7. The method of claim 1, wherein the mathematical function comprises a non-linear function of the latitude of the geographical position.

8. A system for performing a proximity search, comprising:
a database configured to store data representing a latitude of a place of interest and a longitude of the place of interest; and a computing device configured to receive data representing a geographical position and data representing a distance and to automatically process the data to:
determine a first latitude north of the geographical position by an amount of the distance,
determine a second latitude south of the geographical position by the amount of the distance,
determine a first longitude west of the geographical position based on the amount of the distance and a mathematical function of a latitude of the geographical position,
determine a second longitude east of the geographical position based on the amount of the distance and the mathematical function of the latitude of the geographical position,
determine whether the place of interest is proximate to the geographical position based on a determination that the latitude of the place of interest is between the first latitude and the second latitude and the longitude of the place of interest is between the first longitude and the second longitude, and
output a result of the proximity determination.

9. The system of claim 8, further comprising:
an output device configured to present a name of the place of interest if the latitude of the place of interest is between the first latitude and the second latitude and the longitude of the place of interest is between the first longitude and the second longitude.

10. The system of claim 9, wherein the output device is further configured to present additional information associated with the place of interest.

11. The system of claim 8, further comprising:
an input device configured to input the data representing the geographical position and the data representing the distance.

12. The system of claim 8, wherein the computing device is configured to determine a first sum, a first difference, a second sum, and a second difference, the first sum is equal to a latitude, in radians, of the geographical position added to a first quotient, the first quotient is equal to a first product divided by a measure of a circumference of the Earth, the first product is equal to the distance multiplied by two multiplied by pi, the first difference is equal to the first quotient subtracted from the latitude, in radians, of the geographical position, the second sum is equal to a longitude, in radians, of the geographical position added to a second quotient, the second quotient is equal to the first product divided by a second product, the second product is equal to a measure of a radius of the Earth multiplied by two multiplied by pi multiplied by a cosine of the latitude of the geographical position, and the second difference is equal to the second quotient subtracted from the longitude, in radians, of the geographical position.

13. The system of claim 8, wherein the mathematical function comprises a cosine function of the latitude of the geographical position.

14. The system of claim 8, wherein the mathematical function comprises a non-linear function of the latitude of the geographical position.

15. A computer-readable medium having stored thereon computer-executable instructions that, if executed by a computing device, cause the computing device to perform a method for performing a proximity search, the method comprising:
receiving data representing a geographical position and data representing a distance;
processing the data, including:
determining a first latitude north of the geographical position by an amount of the distance,
determining a second latitude south of the geographical position by the amount of the distance,
determining a first longitude west of the geographical position based on the amount of the distance and a mathematical function of a latitude of the geographical position, determining a second longitude east of the geographical position based on the amount of the distance and the mathematical function of the latitude of the geographical position;

determining whether a place of interest is proximate to the geographical position based on a determination that a latitude of the place of interest is between the first latitude and the second latitude and a longitude of the place of interest is between the first longitude and the second longitude; and outputting a result of the proximity determination.

16. The computer-readable medium of claim 15, wherein said processing the data comprises:

determining a sum of a latitude, in radians, of the geographical position added to a first quotient, the first quotient being equal to a first product divided by a measure of a circumference of the Earth, the first product being equal to the distance multiplied by two multiplied by pi;

determining a difference of the first quotient subtracted from the latitude, in radians, of the geographical position;

determining a sum of a longitude, in radians, of the geographical position added to a second quotient, the second quotient being equal to the first product divided by a second product, the second product being equal to a measure of a radius of the Earth multiplied by two multiplied by pi multiplied by a cosine of the latitude of the geographical position; and determining a difference of the second quotient subtracted from the longitude, in radians, of the geographical position.

17. The computer-readable medium of claim 15, wherein the mathematical function comprises a cosine function of the latitude of the geographical position.

18. The computer-readable medium of claim 15, wherein the mathematical function comprises a non-linear function of the latitude of the geographical position.

19. A method for performing a proximity search, comprising:

receiving, at a computing device, data representing a geographical position that defines a center of a circle and data representing a distance that defines a radius of the circle;

determining, by the computing device, a polygon within which the circle is inscribed, the polygon being defined by respective sets of latitudes and longitudes corresponding to vertices of the polygon;

determining, by the computing device, whether a place of interest is proximate to the geographical position based on a determination that a latitude and a longitude of a geographical position of the place of interest is within the polygon; and outputting a result of the proximity determination from the computing device.

20. The method of claim 19, wherein the polygon is a rectangle having a first side with a first length and a second side with a second length, wherein the first length is different from the second length.

21. The method of claim 19, wherein the polygon is a parallelogram having an interior angle that is less than ninety degrees.

22. The method of claim 19, wherein the polygon is a rhombus having an interior angle that is less than ninety degrees.

23. A system for performing a proximity search, comprising:

a database configured to store data representing a geographical position of a place of interest; and a computing device configured to receive data representing a geographical position that defines a center of a circle and data representing a distance that defines a radius of the circle, to determine a polygon within which the circle is inscribed, wherein the polygon is defined by respective sets of latitudes and longitudes corresponding to vertices of the polygon, to determine whether the place of interest is proximate to the geographical position that defines the center of the circle based on a determination that a latitude and a longitude of the geographical position of the place of interest is within the polygon, and to output a result of the proximity determination.

24. A computer-readable medium having stored thereon computer-executable instructions that, if executed by a computing device, cause the computing device to perform a method for performing a proximity search, the method comprising:

receiving data representing a geographical position that defines a center of a circle and data representing a distance that defines a radius of the circle;

determining a polygon within which the circle is inscribed, the polygon being defined by respective sets of latitudes and longitudes corresponding to vertices of the polygon;

determining whether a place of interest is proximate the geographical position based on a determination that a latitude and longitude of a geographical position of the place of interest are within the polygon; and outputting a result of the proximity determination.

25. A system for performing a proximity search, comprising:

a database including a plurality of records storing position information, wherein the position information in each of the plurality of records includes a latitude and a longitude associated with a position; and a proximity searcher configured to:

receive a search radius defining a circular search area centered around a predetermined position, map the circular search area to a smallest square search area into which the circular search area can fit based on the search radius, the square search area being defined by of a set of latitudes and longitudes of vertices of the square search area, wherein the smallest square search area covers a latitude range and a longitude range corresponding respectively to a height and a width of the smallest square search area, the height and the width corresponding to a distance equal to at least twice the search radius, and compare the set of latitudes and longitudes to the position information in the plurality of records stored in the database to determine which of the plurality of records include the position information within the smallest square search area.

26. A computer-readable medium having stored thereon computer-executable instructions that, if executed by a computing device, cause the computing device to perform a method comprising:

receiving a search radius defining a circular search area centered around a predetermined position;

mapping the circular search area to a smallest square search area into which the circular search area can fit based on the search radius, the square search area being defined by a set of latitudes and longitudes of vertices of the square search area, wherein the smallest square search area covers a latitude range and a longitude range corresponding respectively to a height and a width of the smallest square search area, the height and the width corresponding to a distance equal to at least twice the search radius; and comparing the set of latitudes and longitudes to position information in a plurality of records stored in a database to determine which of the plurality of records include the position information within the smallest square search area, wherein the position information in the plurality of records includes a latitude and a longitude associated with a position.

27. A system for performing a proximity search, comprising:

- a computing device including memory and at least one processor;
- means for receiving data representing a geographical position and data representing a distance;
- means for determining a first latitude north of the geographical position by an amount of the distance, for determining a second latitude south of the geographical position by an amount of the distance, for determining a first longitude west of the geographical position based on the amount of the distance and a mathematical function of a latitude of the geographical position, and for determining a second longitude east of the geographical position based on the amount of the distance and the mathematical function of the latitude of the geographical position; and
- means for determining whether a place of interest is proximate to the geographical position based on a determination that a latitude of the place of interest is between the first latitude and the second latitude and a longitude of the place of interest is between the first longitude and the second longitude.

28. A system for performing a proximity search, comprising:

- a computing device including memory and at least one processor;
- means for receiving data representing a geographical position that defines a center of a circle and data representing a distance that defines a radius of the circle;
- means for determining a polygon within which the circle is inscribed, the polygon being defined by respective sets of latitudes and longitudes corresponding to vertices of the polygon; and
- means for determining whether a place of interest is proximate to the geographical position that defines the center of the circle based on a determination that a latitude and longitude of a geographical position of the place of interest are within the polygon.

* * * * *

UNITED STATES PATENT AND TRADEMARK OFFICE
CERTIFICATE OF CORRECTION

| | | |
|---|---|---|
| PATENT NO. | : 7,783,621 B2 | Page 1 of 1 |
| APPLICATION NO. | : 11/356442 | |
| DATED | : August 24, 2010 | |
| INVENTOR(S) | : Cooper et al. | |

It is certified that error appears in the above-identified patent and that said Letters Patent is hereby corrected as shown below:

Claims

Column 14, line 43, "defined by of a set of latitudes" should read --defined by a set of latitudes--.

Signed and Sealed this
Twenty-sixth Day of April, 2011

David J. Kappos
*Director of the United States Patent and Trademark Office*